(12) United States Patent
Jeong (10) Patent No.: US 11,686,961 B2
(45) Date of Patent: Jun. 27, 2023

(54) DISPLAY PANEL

(71) Applicant: Samsung Display Co., Ltd., Yongin-si (KR)

(72) Inventor: Gyeong Ho Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 211 days.

(21) Appl. No.: 17/068,759

(22) Filed: Oct. 12, 2020

(65) Prior Publication Data

US 2021/0041741 A1 Feb. 11, 2021

Related U.S. Application Data

(62) Division of application No. 15/679,396, filed on Aug. 17, 2017, now Pat. No. 10,816,838.

(30) Foreign Application Priority Data

Aug. 19, 2016 (KR) .......................... 10-2016-0105471

(51) Int. Cl.
G02F 1/1333 (2006.01)

(52) U.S. Cl.
CPC .. *G02F 1/133308* (2013.01); *G02F 1/133305* (2013.01); *G02F 2201/503* (2013.01)

(58) Field of Classification Search
None
See application file for complete search history.

(56) References Cited

U.S. PATENT DOCUMENTS

| | | | |
|---|---|---|---|
| 8,466,613 B2 | 6/2013 | Yee | |
| 8,471,462 B2 | 6/2013 | Moon | |
| 9,610,751 B2 | 4/2017 | Jung et al. | |
| 2006/0044490 A1 | 3/2006 | Ichioka et al. | |
| 2006/0152648 A1 | 7/2006 | Kim et al. | |
| 2009/0290087 A1* | 11/2009 | Bauer, Jr. .............. | G06F 1/1637 361/679.26 |
| 2011/0241540 A1 | 10/2011 | Kim | |
| 2012/0026577 A1 | 2/2012 | Tsai et al. | |
| 2012/0242926 A1* | 9/2012 | Hsu ...................... | G02B 6/0001 349/58 |
| 2013/0135877 A1 | 5/2013 | Oh et al. | |

(Continued)

FOREIGN PATENT DOCUMENTS

KR 10-2011-0130945 A 12/2011
KR 10-2012-0023897 A 3/2012

(Continued)

OTHER PUBLICATIONS

Non-Final Office Action dated May 10, 2019, in U.S. Appl. No. 15/679,396.

(Continued)

*Primary Examiner* — Thanh Nhan P Nguyen (74) *Attorney, Agent, or Firm* — H.C. Park & Associates, PLC (57) ABSTRACT

A display panel capable of resisting external shock forces includes a display module to display an image having a first surface and a second surface, a first layer disposed on the second surface of the display module, and at least one second layer adjacent to the first buffer layer and having at least one opening configured to receive a deflected portion of the first layer.

15 Claims, 5 Drawing Sheets

(56) References Cited

U.S. PATENT DOCUMENTS

2013/0208209 A1 8/2013 Zhou
2015/0153607 A1 6/2015 Chen et al.
2016/0170127 A1 6/2016 Kim et al.
2018/0013080 A1 1/2018 Kim et al.

FOREIGN PATENT DOCUMENTS

| KR | 10-2013-0065240 A | 6/2013 |
| KR | 10-0889532 B1 | 7/2015 |
| KR | 10-2015-0113352 A | 10/2015 |
| KR | 10-2016-0070904 | 6/2016 |
| KR | 1020180006530 | 1/2018 |

OTHER PUBLICATIONS

Final Office Action dated Nov. 15, 2019, in U.S. Appl. No. 15/679,396.
Non-Final Office Action dated Mar. 6, 2020, in U.S. Appl. No. 15/679,396.
Notice of Allowance dated Jun. 30, 2020, in U.S. Appl. No. 15/679,396.

\* cited by examiner

DISPLAY PANEL

CROSS-REFERENCE TO RELATED APPLICATIONS

This application is a Divisional of U.S. patent application Ser. No. 15/679,396, filed on Aug. 17, 2017, and claims priority from and the benefit of Korean Patent Application No. 10-2016-0105471, filed on Aug. 19, 2016, which is hereby incorporated by reference for all purposes as if fully set forth herein.

BACKGROUND

Field

The invention relates generally to display panels, and more particularly, to a display panel having improved shock resistance to both surface and point type forces.

Discussion of the Background

Recently, various types of display panels are being developed. Among the recently developed display panels, an organic light emitting display panel is representative.

The organic light emitting display panel includes two electrodes and an organic light emitting layer positioned between the two electrodes. The two electrodes in the organic light emitting display panel respectively inject electrons and holes into the organic light emitting layer. The electrons and holes injected into the organic light emitting layer are combined and form excitons. The exciton emits energy and light so that the organic light emitting layer may emit light.

Defects may occur in the display panel when a shock force is applied from the outside. In this case, the display quality may deteriorate, such that a display panel resistant external shock is required. Shock forces applied to the display typically take the form of a pin point type force, such as occurs if a sharp object like a pen or knife is dropped onto a display, or a surface wide type of force, such as applied by a heavy object pressed against a large surface area of the display.

With the advent of flexible display panels, the materials used to form display panels and protect them from external shocks have become thinner.

The above information disclosed in this Background section is only for enhancement of understanding of the background of the inventive concepts, and, therefore, it may contain information that does not form the prior art that is already known in this country to a person of ordinary skill in the art.

SUMMARY

Display panels that are very resistant to a point type of shock force are not very resistant to a surface type of external shock and vice-versa. Moreover, flexible display panels capable of being be bent or folded are formed from thinner layers than those used in conventional inflexible displays. Display panels constructed according to the principles of the invention provide displays that are very resistant to external shocks from both point type and surface type shock forces, even if the display is formed from thin layers of materials capable of being bent or folded. For example, Applicant discovered that displays having buffer layers with different configurations and/or densities can provide excellent resistance to both types of external shocks, even in thin, flexible display panels.

Additional aspects will be set forth in the detailed description which follows, and, in part, will be apparent from the disclosure, or may be learned by practice of the inventive concepts.

According to one aspect of the invention, a display panel includes a display module to display an image having a first surface and a second surface, a first layer disposed on the second surface of the display module, and at least one second layer adjacent to the first buffer layer and having at least one opening configured to receive a deflected portion of the first layer. The second layer occupies a different area than the first layer without overlapping the first layer.

The second layer may be disposed along at least a part of an edge area of the display panel.

The display panel may further include at least one metal film adjacent to the first layer.

The metal film may include at least one material selected from the group consisting of titanium (Ti), zirconium (Zr), vanadium (V), niobium (Nb), tantalum (Ta), chrome (Cr), molybdenum (Mo), tungsten (W), manganese (Mn), iron (Fe), ruthenium (Ru), cobalt (Co), rhodium (Rh), nickel (Ni), palladium (Pd), platinum (Pt), copper (Cu), silver (Ag), gold (Au), zinc (Zn), cadmium (Cd), aluminum (Al), gallium (Ga), indium (In), and an alloy of the above metals.

The display panel may further include a cover layer adjacent to the first surface of the display module.

The hardness of the cover layer may be from about 3 H to about 6 H.

The first layer and the second layer may have approximately the same density.

The first layer and the second layer may have different densities.

The density of the first layer may be higher than the density of the second layer.

The density of the first layer may be lower than the density of the second layer.

The density of the first layer may be about 0.6 g/cm$^3$ to about 1.2 g/cm$^3$ and the density of the second layer may be about 0.1 g/cm$^3$ to about 0.5 g/cm$^3$.

The density of the first layer may be about 0.1 g/cm$^3$ to about 0.5 g/cm$^3$ and the density of the second layer may be about 0.6 g/cm$^3$ to about 1.2 g/cm$^3$.

At least one of the first and second layers may include elastic material capable of deforming in response to an external point shock force or a surface shock force.

The first and second layers may directly contact each other.

The first and second layers each may include a buffer layer.

According to the principles of the invention, the shock resistance properties of the display panel may be improved. Therefore, exemplary embodiments of display panels of the invention can provide a display panel capable of withstanding external shock well and have high display quality.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
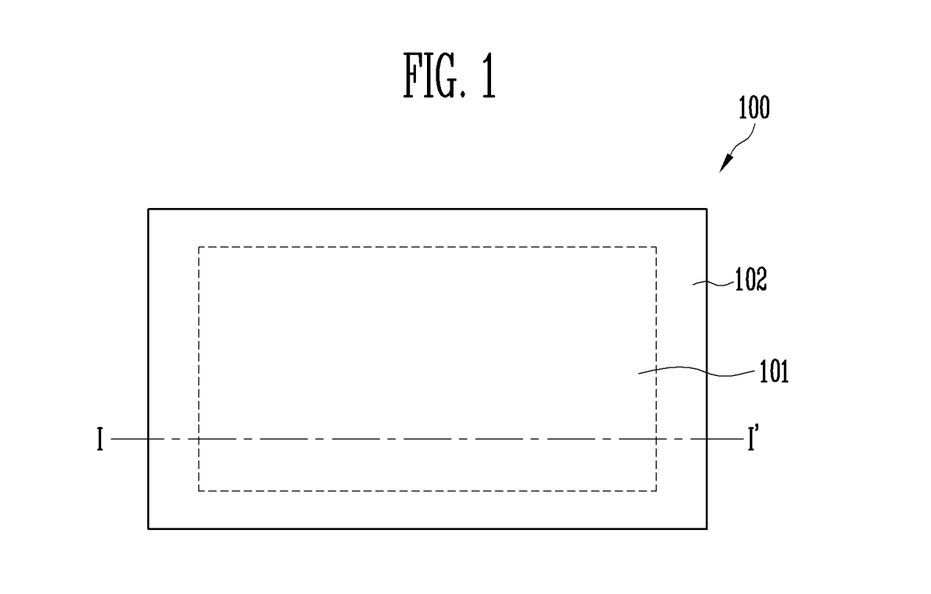
FIG. 1 is a plan view schematically illustrating a display panel constructed according to the principles of the invention.

FIG. 1 is a plan view schematically illustrating a display panel 100 constructed according to the principles of the invention. The display panel 100 may have any number of various shapes. For example, the display panel 100 may be a rectangular plate having two pairs of sides that run parallel with each other as illustrated in FIG. 1. The shape of the display panel 100 is only an example and the display panel 100 may have one of other various shapes than the illustrated rectangular shape.

At least a part of the display panel 100 may be flexible and the flexible part is foldable. That is, the display panel 100 may include a foldable area having flexibility and a rigid area that is provided at at least one side of the foldable area and that is not foldable. Here, for convenience sake, the area that is not folded is referred to as the rigid area. The rigid area means an area having reduced flexibility compared to the foldable area or an area with flexibility, which is not folded, as well as a hard area without flexibility. According to an embodiment of the invention, the entire display panel 100 may correspond to the foldable area. For example, in the case of a rolled display panel, the entire display panel 100 may correspond to the foldable area.

The flexible display panel 100 may be bent or folded. In order for the flexible display panel to be bent or folded so as to have a reduced radius of curvature, layers that form the display panel 100 are formed to be thinner than conventional inflexible displays. Therefore, the buffer material used for the display panel 100 should be thinner than buffer materials used in conventional inflexible displays. However, when the buffer material is thinner, sufficient buffer effect against external shock may not be obtained. Therefore, a structure in which shock applied to the display panel 100 may be buffered by a thin buffer material is required. In the display panel 100 according to the invention, the radius of curvature is reduced and shock may be effectively buffered even though the thicknesses of the layers are small.

Referring to FIG. 1, the display panel 100 has a display area 101 and a non-display area 102. The display area 101 may include a plurality of pixels (not shown) and may display an image that the display panel 100 desires to output as is known in the art. The non-display area 102 may be formed around the display area 101 and may include a driving signal line (not shown) and a driving element (not shown). The non-display area 102 may surround the display area 101 as shown in FIG. 1. However, the shape of the non-display area 102 may vary and is not limited thereto. For example, the non-display area 102 may be formed only at one side of the display area 101. In addition, when the non-display areas 102 are formed at both ends of the display area 101, the width of the non-display area 102 formed at one end of the display area 101 may be larger than the width of the non-display area 102 formed at the other end of the display area 101. A relationship between the display area 101 and the non-display area 102 may have one of other various forms than the above-described forms.

Figure 2:
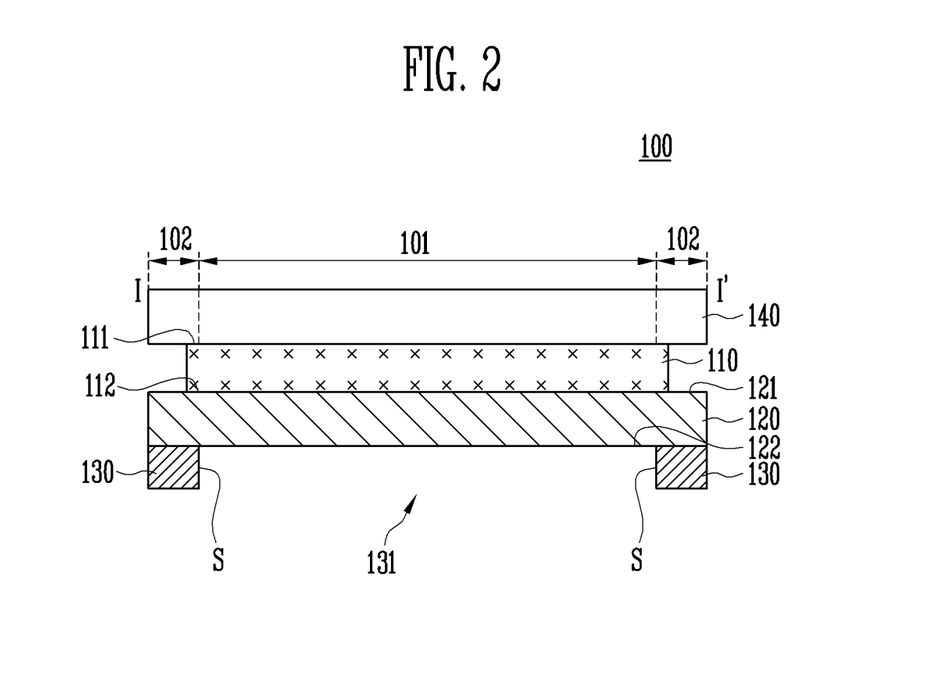
FIG. 2 is a cross-sectional view taken along the line I-I' of FIG. 1 illustrating a first embodiment of a first buffer layer and a second buffer layer constructed according to the principles of the invention.

FIG. 2 is a cross-sectional view taken along the line I-I' of FIG. 1 illustrating a first embodiment of a first buffer layer and a second buffer layer constructed according to the principles of the invention. Referring to FIG. 2, the display panel 100 includes a display module 110 having a first surface 111 (e.g., upper surface viewed in FIG. 2) and a second surface 112 (e.g., bottom surface) to output an image, and a first buffer layer 120 disposed on the second surface 112 of the display module 110. The first buffer layer 120 may also have a first surface 121 (e.g., upper surface) and a second surface 122 (e.g., bottom surface). Referring to FIG. 2, the first surface 121 of the first buffer layer 120 may contact the second surface 112 of the display module 110. The display panel 100 may further include at least one second buffer layer 130 disposed on at least a region (e.g., an edge area) of the second surface 122 of the first buffer layer 120 and project outwardly away from the second surface 112. The second buffer layer 130 may have various shapes. For example, in the illustrated embodiment of FIGS. 2-3, the second buffer layer 130 may be formed around the periphery of the first buffer layer 120. A shown best in FIG. 3, the second buffer layer 130 has at least one opening 131 in which the second buffer layer 130 is not disposed. A cover layer 140 may be disposed on the first surface 111 of the display module 110.

Hereinafter, elements that form the display panel 100 will be described in more detail.

The display module 110 may be a plate having the first surface 111 and the second surface 112 opposite to the first surface 111. The image may be displayed on the first surface 111 of the display module 110. A plurality of pixels may be provided on the display module 110. Each of the pixels may emit white light and/or colored light. Each of the pixels may emit one of red light, green light, and blue light. However, the invention is not limited thereto. Each of the pixels may emit cyan light, magenta light, yellow light, or white light. The pixels may be light emitting elements including organic light emitting layers. However, the invention is not limited thereto. The pixels may be liquid crystal (LC) elements, electrophoretic elements, or electrowetting elements.

The first buffer layer 120 is provided on the second surface 112 of the display module 110. The first buffer layer 120 may buffer shock applied from the outside to the display panel 100. The first buffer layer 120 may have elasticity in order to absorb or diffuse shock. The elastic first buffer layer 120 deforms and absorbs shock when shock is applied from the outside and may be restored to its original state when the shock disappears.

The second buffer layer 130 is disposed adjacent to the first buffer layer 120 with or without intervening elements. For example, the second buffer layer 130 may be disposed on the edge area of the second surface 122 of the first buffer layer 120 (see FIG. 2) or the second buffer layer 130 may be disposed outside and contact the outermost sides of the first buffer layer 120 while surrounding the first buffer layer 120 (see FIG. 4). The second buffer layer 130 may be provided on the first buffer layer 120. The second buffer layer 130 may buffer shock applied from the outside to the display panel 100 together with the first buffer layer 120. The second buffer layer 130 may have elasticity in order to absorb or diffuse shock. Therefore, the second buffer layer 130 deforms and absorbs shock when shock is applied from the outside and may be restored to its original state when the shock disappears.

In one or more exemplary embodiments, the first buffer layer 120 and the second buffer layer 130 may be formed of a porous polymer so as to have elasticity. In this case, the first buffer layer 120 and the second buffer layer 130 may include polystyrene, polyolefin, polyurethane, polyamides, synthetic rubbers, polydimethylsiloxane, polybutadiene, polyisobutylene, [poly(styrene-butadienestyrene)], polyurethanes, polychloroprene, polyethylene, silicon, and combinations of the above compounds. However, the inventive concepts are not limited thereto. In one or more exemplary embodiments, the first buffer layer 120 and the second buffer layer 130 may be formed of the same material or different materials. The first buffer layer 120 and the second buffer layer 130 may be formed of a foaming agent such as sponge.

Figure 3:
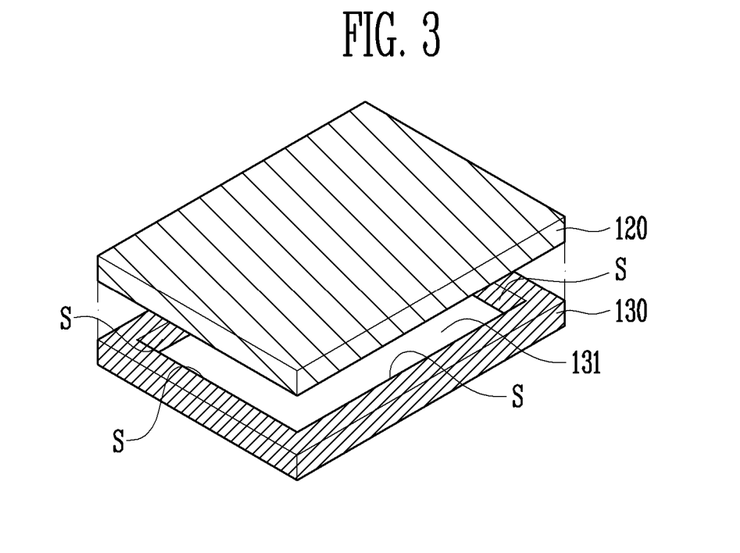
FIG. 3 is a perspective view illustrating the first buffer layer and the second buffer layer according to the exemplary embodiment illustrated in FIG. 2.

As shown best when viewed in plan, the second buffer layer 130 has at least one opening 131 in which the second buffer layer 130 is not provided. The opening 131 may be surrounded by the second buffer layer 130 and the internal sides S of the second buffer layer 130 defines boundary of the opening 131, as shown in FIG. 3. The first buffer layer 120 or another layer in the display panel 100 may be exposed by the opening 131.

The shape of the opening 131 may have various shapes. For example, the shape of the opening 131 may vary in accordance with the shape of the second buffer layer 130 and/or the shape of the display panel 100. For example, when the display panel 100 is rectangular, the opening 131 may also be rectangular. In addition, when the display panel 100 is circular, the opening 131 may also be circular.

In FIG. 2, the opening 131 a side wall S of which is formed of the second buffer layer 130 and which exposes the first buffer layer 120, is illustrated. However, the shape of the opening 131 and the number of openings 131 are not limited thereto. Therefore, a plurality of openings 131 may exist in accordance with the desired shape of the second buffer layer 130.

The first buffer layer 120 and the second buffer layer 130 according to one or more exemplary embodiments, may buffer both point shock and surface shock that may be applied to the display panel 100. Point shock means that high pressure is applied to a narrow area and surface shock means that high pressure is applied to a wide area. For example, point shock may be generated when the display panel 100 is stabbed by a sharp object such as a pen. In addition, surface shock may be generated when the display panel 100 is pressed by a heavy object, for example, in a transportation process. When the display panel 100 is to be used in a daily life, the display panel 100 should be able to withstand both point shock and surface shock.

In order to effectively buffer point shock and surface shock, the thicknesses and densities of the buffer layers are important. In general, as the buffer layers are thicker, buffer effect is higher. However, as described above, as the display panel 100 tends to become thinner, there are limitations on thickening the buffer layers. The buffer effect of the buffer layers is closely related to the densities of the buffer layers.

First, in order to buffer surface shock, the densities of the buffer layers are preferably lower. When surface shock is applied, the buffer layers are bent or compressed and may absorb and diffuse surface shock. Accordingly, in order for the buffer layers to be bent or compressed, the densities of the buffer layers are preferably lower. To the contrary, in order to buffer point shock, the densities of the buffer layers are preferably higher. The display module 110 in the display panel 100 may be bent or cracked by point shock. The buffer layers adjacent to the display module 110 support the display module 110 so that the display module 110 is not bent or cracked at a point at which the display module 110 is shocked.

The display panel 100 constructed according to principles of the invention may withstand surface shock. When surface shock is applied to the first surface 111 of the display module 110, the display module 110 is excessively compressed at the point of shock and may be excessively tensioned at a point adjacent to the point of shock. When the display module 110 is excessively compressed or tensioned, a defect or damage may occur in the pixels in the display module. Therefore, bright spot defect occurs and quality of an output image of the display panel 100 may remarkably deteriorate due to shocks.

According to one or more exemplary embodiments, in order to prevent the display module 110 from being excessively compressed or tensioned, the buffer layers of the display panel 100 may buffer surface shock. When surface shock is applied, the first buffer layer 120 provided on the second surface 112 of the display module 110 is deformed in the direction of the opening 131 and may prevent the display module 110 from being compressed or tensioned since the surface shock is dispersed by the opening 131. The opening 131 provided on the first buffer layer 120 provides a space into which the first buffer layer 120 may be deformed or bent. Therefore, the opening 131 may have a size to accommodate deformation or bending of the first buffer layer 120 by the surface shock. When the opening 131 is too small, although the surface shock is applied to the first buffer layer 120, the first buffer layer 120 may not be deformed so that surface shock buffer effect of the first buffer layer 120 may deteriorate.

According to one or more exemplary embodiments, the opening 131 defined by the second buffer layer 130 should have a height to accommodate bending of deformation of the first buffer layer 120 therein. The height of the opening 131 may be determined by difference in thickness between the first buffer layer 120 and the second buffer layer 130. According to an embodiment of the invention, the opening 131 that may provide the above-described buffering effect may range from about 20 μm to about 80 μm. When the height of the opening 131 is less than about 20 μm, when surface shock is applied, the first buffer layer 120 may not be deformed or bent. In addition, when the height of the opening 131 is larger than about 80 μm, the first buffer layer 120 may be excessively bent by the surface shock so that the buffer effect may deteriorate. In this case, the first buffer layer 120 may be vulnerable to point shock.

The display panel 100 also may withstand point shock. When point shock is applied to the display panel 100, the display module 110 may be bent or cracked or otherwise deformed at the point of shock. Since the first buffer layer 120 and the second buffer layer 130 provided on the second surface 112 of the display module 110 support the display module 110, the display module 110 is not bent or cracked although point shock is applied to the display module 110.

As described above, various shapes may be employed for the first buffer layer 120 and the second buffer layer 130 to absorb point shock and surface shock.

In one or more exemplary embodiments, the display panel 100 may further include the cover layer 140 provided on the first surface 111 of the display module 110. The cover layer 140 is provided on the display module 110 and protects the display module 110. The cover layer 140 may be formed of a transparent insulating material such as glass or organic polymer. The cover layer 140 may be larger than the display area 101 of the display panel 100.

In one or more exemplary embodiments, hardness of the cover layer 140 may be about 3 H through about 6 H. When the display panel 100 includes the cover layer 140, the density of the first buffer layer 120 may vary in accordance with the hardness of the cover layer 140. For example, when the hardness of the cover layer 140 is low, the cover layer 140 may be flexible. At this time, the cover layer 140 may buffer a part of the surface shock. Therefore, the amount of surface shock to be buffered by the first buffer layer 120 may be reduced. Therefore, the first buffer layer 120 preferably has high density in order to buffer point shock rather than surface shock. To the contrary, when the hardness of the cover layer 140 is high, the cover layer 140 may be hard. At this time, the cover layer 140 may buffer a part of the point shock. Therefore, the first buffer layer 120 preferably has low density in order to buffer surface shock.

In one or more exemplary embodiments, the first buffer layer 120 and the second buffer layer 130 may have the same density. For example, both the first buffer layer 120 and the second buffer layer 130 may have high density or low density. In this case, when both the first buffer layer 120 and the second buffer layer 130 have low density, in order to buffer point shock, the display panel 100 may include a metal film 150 (see FIGS. 9 and 10).

In one or more exemplary embodiments, the first buffer layer 120 and the second buffer layer 130 may have different densities. For example, the first buffer layer 120 may have a high density and the second buffer layer 130 may have a low density or the first buffer layer 120 may have a low density and the second buffer layer 130 may have a high density. In the case in which the first buffer layer 120 has high density and the second buffer layer 130 has low density, when surface shock is applied, the first buffer layer 120 is bent inward toward the opening 131 and, at the same time, the second buffer layer 130 is compressed to absorb the surface shock.

For example, when the density of the first buffer layer 120 is higher than the density of the second buffer layer 130, the density of the first buffer layer 120 may be about 0.6 g/cm$^3$ through about 1.2 g/cm$^3$ and the density of the second buffer layer 130 may be about 0.1 g/cm$^3$ through about 0.5 g/cm$^3$. In the above-described ranges of the densities of the first buffer layer 120 and the second buffer layer 130, point shock and surface shock are effectively buffered without the use of a metal film such as metal firm 150 (see FIGS. 9 and 10). For instance, when the density of the first buffer layer 120 is less than about 0.6 g/cm$^3$, the point shock buffer effect of the first buffer layer 120 may not be sufficient. In addition, when the density of the first buffer layer 120 is larger than about 1.2 g/cm$^3$, the first buffer layer 120 may not contribute to buffering surface shock. When the density of the second buffer layer 130 is not about 0.1 g/cm$^3$ through about 0.5 g/cm$^3$, the second buffer layer 130 may not effectively buffer point shock and/or surface shock.

On the other hand, when the density of the first buffer layer 120 is lower than the density of the second buffer layer 130, the density of the first buffer layer 120 may be about 0.1 g/cm$^3$ through about 0.5 g/cm$^3$ and the density of the second buffer layer 130 may be about 0.6 g/cm through about 1.2 g/cm$^3$. In this case, the first buffer layer 120 may not effectively buffer point shock applied to the display panel 100. Therefore, when the density of the first buffer layer 120 is in this range, the display panel 100 preferably further includes the metal film 150 (refer to FIGS. 9 and 10). In the case in which the display panel 100 includes the metal film 150, when the density of the first buffer layer 120 is less than 0.1 g/cm$^3$, the display panel 100 may be vulnerable to point shock. When the density of the first buffer layer 120 is larger than 0.5 g/cm$^3$, the display panel 100 may be vulnerable to surface shock. When the density of the second buffer layer 130 is not about 0.1 g/cm$^3$ through about 0.5 g/cm$^3$, the second buffer layer 130 may not effectively buffer point shock and/or surface shock.

According to one or more exemplary embodiments, the display panel 100 may further include a heat sinking layer, an electronic wave blocking layer, a light blocking layer, and a polarizing plate.

The heat sinking layer prevents heat generated by the display panel 100 from being transmitted to the display module 110. Since the display panel 100 is adjacent to a driver such as a printed circuit board (PCB), the heat generated by the driver may be transmitted to the display panel 100. Since the heat may facilitate deterioration of the pixels, as the heat is transmitted, defect may occur in the pixels. The heat sinking layer insulates and draws the heat generated by the driver. The heat sinking layer may include at least one among aluminum (Al), copper (Cu), molybdenum (Mo), silver (Ag), and titanium (Ti). In addition, the heat sinking layer may include a material with high heat conductivity capable of easily emitting heat. For example, the heat sinking layer may include at least one of graphite, graphene, carbon nanotube, and a metal filler.

The electronic wave blocking layer blocks electromagnetic interference (EMI) generated by the driver. The electronic wave blocking layer may be formed of a conductive sheet. The conductive sheet may include at least one of gold (Au), Ag, Cu, Al, Ti, indium tin oxide (ITO), indium zinc oxide (IZO), carbon nanotube, and graphite.

The light blocking layer prevents light from passing through from a rear surface of the display panel 100 to a front surface of the display panel 100. The light blocking layer may be in the form of a light blocking film and may be black.

In addition, the layers of the display panel 100 may be attached by an adhesive. The adhesive may include an acryl-based polymer. However, the invention is not limited thereto. A person skilled in the art may use any well-known material as the adhesive or other attachment techniques as occasion demands.

FIG. 3 is a perspective view illustrating the first buffer 120 and the second buffer layer 130 of FIG. 2. Referring to FIG. 3, the second buffer layer 130 and the first buffer layer 120 may have first areas that overlap as seen in a plan view. According to an embodiment of the invention, the first area may be positioned in the non-display area 102 of the display panel 100. The first area may be formed along an edge area of the first buffer layer 120. However, the position of the first area is not limited thereto. For example, the first area may be formed only in a part (e.g., a short side or a long side of a rectangle) of the edge of the first buffer layer 120. When the first buffer layer 120 is circular, the first area may be formed in a part of a circumference of the first buffer layer 120 in the form of an arc. The first area is not necessarily positioned at the edge of the first buffer layer 120. The first area may be positioned at an inside of the edge of the first buffer layer 120. Seen in plan, the first area may be positioned in the non-display area 102. However, the invention is not limited thereto. The second buffer layer 130 is not formed in the opening 131. Therefore, when surface shock is applied, the first buffer layer 120 may be deformed or bent inward toward the opening 131.

Figure 4:
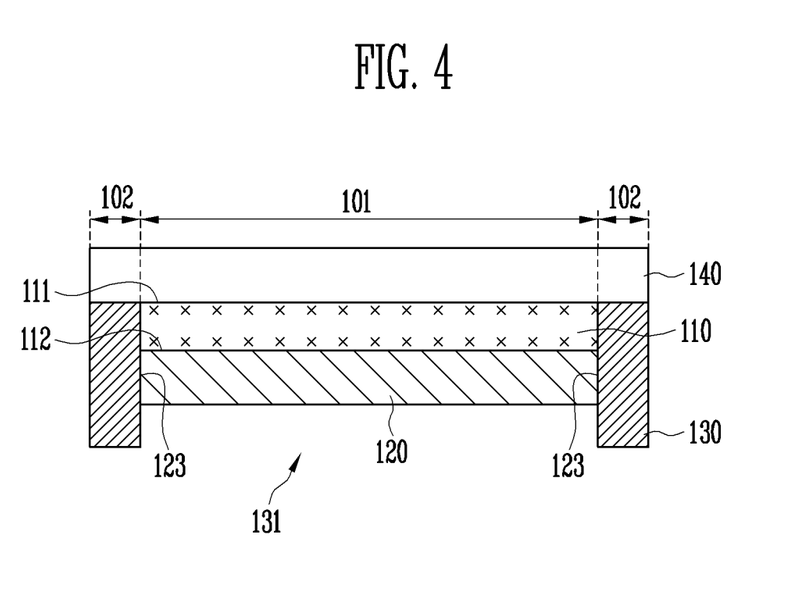
FIG. 4 is a cross-sectional view of a display panel illustrating a second embodiment of a first buffer layer and a second buffer layer constructed according to the principles of the invention.
Figure 5:
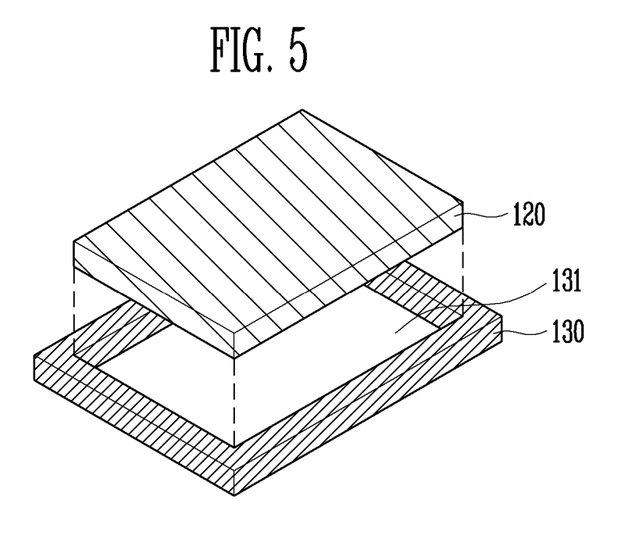
FIG. 5 is a perspective view illustrating the first buffer layer and the second buffer layer according to the exemplary embodiment illustrated in FIG. 4.

FIG. 4 is a cross-sectional view of a display panel illustrating a second embodiment of a first buffer layer and a second buffer layer constructed according to the principles of the invention. FIG. 5 is a perspective view illustrating the first buffer layer 120 and the second buffer layer 130 of FIG. 4

Referring to FIGS. 4 and 5, the second buffer layer 130 may be provided in a different area from the first buffer layer 120. In this case, the first buffer layer 120 and the second buffer layer 130 have a difference in thickness, which may be equal to the height of the opening 131. As illustrated in FIG. 5, the first buffer layer 120 and the second buffer layer 130 may be provided in different areas, so the first buffer layer 120 may be retained within the opening defined by the second buffer layer 130 e.

As illustrated in FIG. 4, when the first buffer layer 120 and the second buffer layer 130 are provided in different areas, the second buffer layer 130 may be provided at an outside surface of the display module 110 and the first buffer layer 120. Therefore, the second buffer layer 130 may contact at least a part of the outside of the display module 110. The second buffer layer 130 may contact the non-display area 102 of the display module 110. When the second buffer layer 130 contacts the non-display area 102 of the display module 110, the second buffer layer 130 and the display module 110 may be attached by using an optically non-transparent adhesive. In addition, the second buffer layer 130 may contact the first buffer layer 120. In this case, the second buffer layer 130 may contact at least a part of the outside of the first buffer layer 120. That is, the second buffer layer 130 may contact sides 123 of the first buffer layer 120 while surrounding the first buffer layer 120. When the cover layer 140 illustrated in FIG. 2 is provided in the display panel 100, the second buffer layer 130 may contact the cover layer 140. When the second buffer layer 130 is directly attached to the cover layer 140, a more stable structure is obtained than when the second buffer layer 130 is connected only to the display module 110 or the first buffer layer 120.

Figure 6:
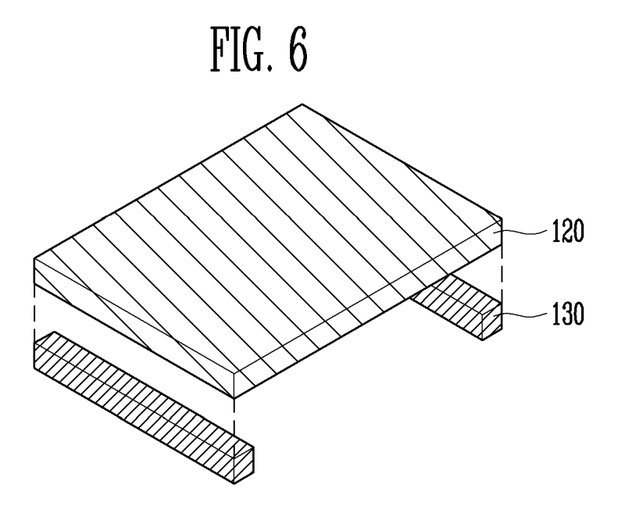
FIG. 6 is a perspective view illustrating a third embodiment of a first buffer layer and a second buffer layer constructed according to the principles of the invention.

FIG. 6 is a perspective view illustrating a third embodiment of a first buffer layer and a second buffer layer constructed according to the principles of the invention. Referring to FIG. 6, the first buffer 120 and the second buffer layer 130 have first areas that overlap in the short axis direction of the display panel 100.

Figure 7:
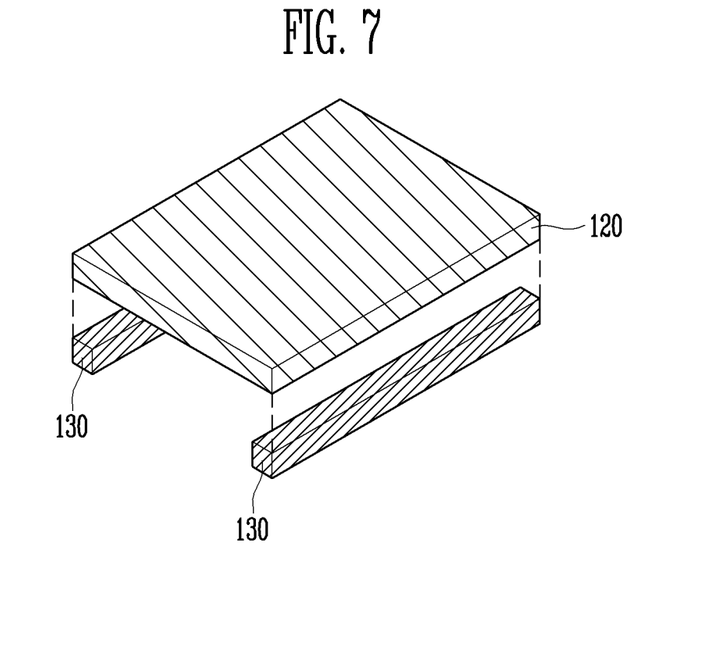
FIG. 7 is a perspective view illustrating a modification of the third embodiment of the first buffer layer and the second buffer layer.

FIG. 7 is a perspective view illustrating a modification of the third embodiment of the first buffer layer and the second buffer layer. Referring to FIG. 7, the first buffer layer 120 and the second buffer layer 130 have first areas that overlap in the longitudinal axis direction of the display panel 100.

Figure 8:
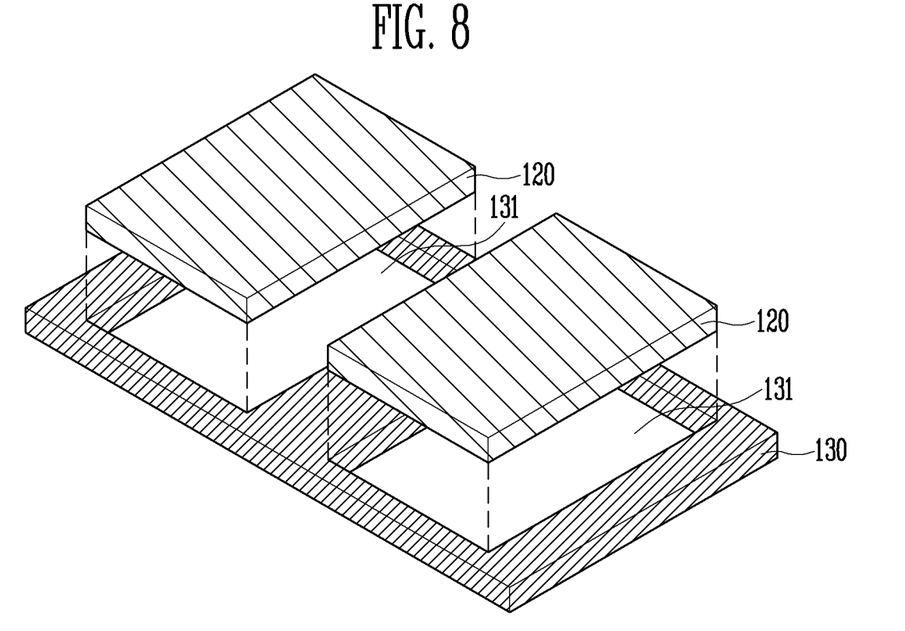
FIG. 8 is a perspective view illustrating a fourth embodiment of a first buffer layer and a second buffer layer constructed according to the principles of the invention.

FIG. 8 is a perspective view illustrating a fourth embodiment of the first buffer layer 120 and the second buffer layer 130 constructed according to the principles of the invention. Referring to FIG. 8, the first buffer layer 120 and the second buffer layer 130 are provide in different areas that do not overlap in plan. Two openings 131 are provided in the second buffer layer 130. Referring to FIG. 8, the two first buffer layers 120 are provided. The two first buffer layers 120 are spaced apart from each other in the longitudinal axis direction of the second buffer layer 130. However, the shape of the first buffer layer 120 is not limited thereto. For example, the first buffer layer 120 may be formed in the short axis direction of the second buffer layer 130. In addition, no less than three or four first buffer layers 120 may exist. FIG. 8 illustrates that both the first buffer layer 120 and the second buffer layer 130 are rectangular. However, the first buffer layer 120 and the second buffer layer 130 may have various shapes. For example, the first buffer layer 120 may be circular and the second buffer layer 130 may be square or the first buffer layer 120 may be diamond-shaped and the second buffer layer 130 may be circular.

When the first buffer layer 120 and the second buffer layer 130 have the structure of FIG. 8, the first buffer layer 120 may be deformed or bent inwardly toward one of the two openings 131 in accordance with the position of the display panel 100 to which a surface shock is applied.

Figure 9:
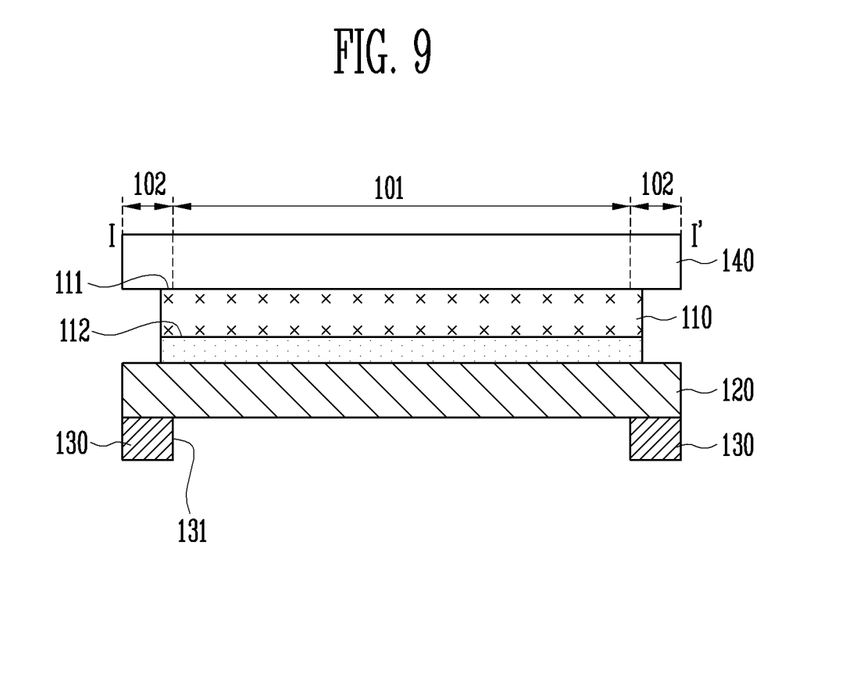
FIG. 9 is a cross-sectional view of another embodiment of a display panel constructed according to one the principles of the invention having first and second buffer layers corresponding the first embodiment illustrated in FIG. 2.
Figure 10:
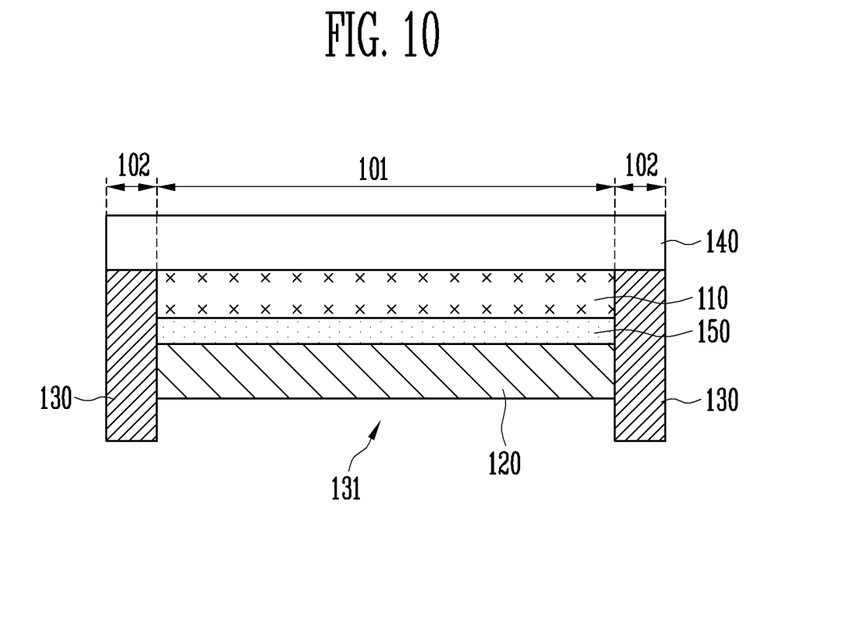
FIG. 10 is a cross-sectional view of a another embodiment of a display panel constructed according to one the principles of the invention having first and second buffer layers corresponding the second embodiment illustrated in FIG. 4.

FIGS. 9 and 10 are cross-sectional views of other embodiments of display panels constructed according to the principles of the invention having first and second buffer layers corresponding the first embodiment illustrated in FIG. 2 and the second embodiment illustrated in FIG. 4, respectively, which incorporate a metal film. Referring to FIGS. 9 and 10, at least one metal film 150 may be provided on the first buffer layer 120. The metal film 150 prevents the display module 110 from being bent or cracked by point shock. That is, when the hard metal film 150 is provided on the second surface 112 of the display module 110, the metal film 150 may buffer point shock together with the first buffer layer 120. In particular, since the point shock buffer effect of the metal film 150 is high although a thickness of the metal film 150 is small, the total thickness of the display panel 100 does not remarkably increase. Rather, the thinner first buffer layer 120 may be used by using the metal film 150. Therefore, the display panel 100 may be thinned by including the metal film 150.

The metal film 150 may include at least one of Ti, zirconium (Zr), vanadium (V), niobium (Nb), tantalum (Ta), chrome (Cr), molybdenum (Mo), tungsten (W), manganese (Mn), iron (Fe), ruthenium (Ru), cobalt (Co), rhodium (Rh), nickel (Ni), palladium (Pd), platinum (Pt), Cu, Ag, Au, zinc (Zn), cadmium (Cd), Al, gallium (Ga), indium (In), and an alloy of the above metals. When the metal film 150 is formed of the above elements, the metal film 150 may have EMI blocking/sinking functions, as well as a buffering function.

The thickness of the metal film 150 may be preferably about 10 μm to about 50 μm. When the thickness of the metal film 150 is less than about 10 μm, the point shock buffer effect of the metal film 150 may not be sufficient. In addition, when the thickness of the metal film 150 is larger than about 50 μm, the display panel 100 may be excessively thick.

The metal film may be provided over the entire surface area of display panel when viewed in plan. However, the invention is not limited thereto. When a foldable area exists in the display panel 100, the metal film 150 may be formed in an area excluding the foldable area. This is because the display panel 100 may not be restored to an original state when the display panel 100 is folded and then, unfolded since the metal film 150 has small elasticity.

Hereinafter, exemplary implementations of display panels constructed according to the principles of the invention are described. However, the inventive concepts are not limited to the following examples.

Embodiments

1. Manufacturing of Display Panel

In order to check the buffer effect of a display panel constructed according to principles of the invention, a display device in which the cover layer, the display module, the first buffer layer, and the second buffer layer are sequentially stacked was manufactured. The cover layer was formed of glass having a thickness of 250 μm and hardness of about 4 H (measured by HMV-2). In addition, the display module including an organic light emitting diode (OLED) and having a thickness of 37 μm was used. The first buffer layer and the second buffer layer were formed of polyurethane. The layers of the display panel were attached by using an acryl-based pressure sensitive adhesive (PSA).

Each of display panels according to the inventive embodiments and comparative examples below includes or does not include a metal film. The metal film was formed of an Au alloy. Whether each of the display panels according to the inventive embodiments and the comparative examples includes or does not include the metal film, the thickness of the metal film, the thickness of the first buffer layer, and the thickness of the second buffer layer are as illustrated in TABLE 1.

TABLE 1

|  | Thickness of first cover layer | Density of first cover layer | Thickness of second cover layer | Density of second cover layer | Height of opening | Thickness of metal film |
|---|---|---|---|---|---|---|
| Embodiment 1 | 100 μm | 0.7 g/cm$^3$ | 50 μm | 0.7 g/cm$^3$ | 50 μm | 20 μm |
| Embodiment 2 | 100 μm | 0.7 g/cm$^3$ | 50 μm | 0.4 g/cm$^3$ | 50 μm | 20 μm |
| Embodiment 3 | 100 μm | 0.4 g/cm$^3$ | 50 μm | 0.7 g/cm$^3$ | 50 μm | 20 μm |
| Embodiment 4 | 100 μm | 0.7 g/cm$^3$ | 387 μm | 0.7 g/cm$^3$ | 50 μm | 20 μm |
| Embodiment 5 | 100 μm | 0.7 g/cm$^3$ | 387 μm | 0.4 g/cm$^3$ | 50 μm | 20 μm |
| Embodiment 6 | 100 μm | 0.4 g/cm$^3$ | 387 μm | 0.7 g/cm$^3$ | 50 μm | 20 μm |
| Comparative example 1 | 150 μm | 0.7 g/cm$^3$ |  |  |  |  |
| Comparative example 2 | 100 μm | 0.9 g/cm$^3$ |  |  |  |  |

In the TABLE 1, according to the embodiments 1 through 3, as illustrated in FIG. 2, the second buffer layer and the first buffer layer have the first areas that overlap each other. According to the embodiments 4 through 6, as illustrated in FIG. 4, the second buffer layer and the first buffer layer are provided in different, non-overlapping areas. According to the embodiments 1 through 6, the height of the opening, that is, the step difference between the first buffer layer and the second buffer layer was about 50 μm.

2. Experiment of Shock Resistance Characteristic of Display Device

A pen drop experiment and a ball drop experiment were performed on each of the display panels according to the embodiments and the comparative examples of the TABLE 1. In the pen drop experiment, a BIC Fine pen (a Fine BIC pen of Societe Bic) having a pen tip with a diameter of 0.07 mm and having a weight of 5.7 g including a cover fell freely under the force of gravity onto the display panel by varying the height of fall. In the ball drop experiment, an iron ball with a diameter of 25.4 mm and a mass of 5.5 g fell freely under the force of gravity on the display panel by varying a height of fall.

TABLE 2 illustrates the height limit at which the display panel was damaged by the pen drop or the ball drop when the pen drop and the ball drop were performed. As the height limits are larger in the inventive embodiments than the comparative examples, display panels constructed according to the principles of the invention may withstand external shock better.

TABLE 2

|  | Height Limit of pen drop | Height Limit of ball drop |
|---|---|---|
| Embodiment 1 | 21 cm | 22 cm |
| Embodiment 2 | 25 cm | 24 cm |
| Embodiment 3 | 20.5 cm | 20 cm |
| Embodiment 4 | 20.5 cm | 20 cm |
| Embodiment 5 | 26 cm | 24 cm |
| Embodiment 6 | 22 cm | 21 cm |
| Comparative example 1 | 9 cm | 8 cm |
| Comparative example 2 | 11 cm | 10.5 cm |

As noted from the TABLE 2, the display panel including the first buffer layer, the second buffer layer, and the metal film constructed according to the inventive embodiments 1 through 6 has much higher shock resistance properties than the display panel including only the first buffer layer according to the comparative examples 1 and 2.

When the embodiments 1 through 3 and the embodiments 4 through 6 are compared with each other, whether the first buffer layer and the second buffer layer overlap each other does not remarkably affect the shock resistance characteristic of the display device.

Display panels constructed according to the principles of the invention may be applied to one of various electronic devices. For example, the display device may be applied to one of various wearable devices such as a television set, a laptop computer, a mobile phone, a smart phone, a smart pad, a PMP, a personal digital assistant (PDA), a navigator, and a smart watch.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display panel comprising:
   a display module to display an image having a first surface and a second surface;
   a first layer having elasticity and being disposed on and contacting the second surface of the display module; and
   at least one second layer having elasticity, being adjacent to the first layer and having at least one opening configured to receive the first layer,
   wherein the second layer occupies a different area than the first layer without overlapping the first layer.

2. The display panel of claim 1, wherein the second layer is disposed along at least a part of an edge area of the display panel.

3. The display panel of claim 1, further comprising at least one metal film adjacent to the first layer.

4. The display panel of claim 3, wherein the metal film comprises at least one material selected from the group consisting of titanium (Ti), zirconium (Zr), vanadium (V), niobium (Nb), tantalum (Ta), chrome (Cr), molybdenum (Mo), tungsten (W), manganese (Mn), iron (Fe), ruthenium (Ru), cobalt (Co), rhodium (Rh), nickel (Ni), palladium (Pd), platinum (Pt), copper (Cu), silver (Ag), gold (Au), zinc (Zn), cadmium (Cd), aluminum (Al), gallium (Ga), indium (In), and an alloy of the above metals.

5. The display panel of claim 1, further comprising a cover layer adjacent to the first surface of the display module.

6. The display panel of claim 5, wherein hardness of the cover layer is about 3 H to about 6 H.

7. The display panel of claim 1, wherein the first layer and the second layer have approximately the same density.

8. The display panel of claim 1, wherein the first layer and the second layer have different densities.

9. The display panel of claim 8, wherein the density of the first layer is higher than the density of the second layer.

10. The display panel of claim 9, wherein the density of the first layer is about 0.6 g/cm$^3$ to about 1.2 g/cm$^3$ and the density of the second buffer layer is about 0.1 g/cm$^3$ to about 0.5 g/cm$^3$.

11. The display panel of claim 8, wherein the density of the first layer is lower than the density of the second layer.

12. The display panel of claim 11, wherein the density of the first layer is about 0.1 g/cm$^3$ to about 0.5 g/cm$^3$ and the density of the second layer is about 0.6 g/cm$^3$ to about 1.2 g/cm$^3$.

13. The display panel of claim 1, wherein at least one of the first and second layers comprise elastic material capable of deforming in response to an external point shock force or a surface shock force.

14. The display panel of claim 1, wherein the first and second layers directly contact each other.

15. The display panel of claim 1, wherein the first and second layers each comprise a buffer layer.

* * * * *